US006965583B2

(12) United States Patent
Horikawa

(10) Patent No.: US 6,965,583 B2
(45) Date of Patent: Nov. 15, 2005

(54) TCP/IP COMMUNICATION SYSTEM AND COMMUNICATION CHANNEL RELEASING METHOD IN THE SAME

(75) Inventor: Kiyotaka Horikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 851 days.

(21) Appl. No.: 09/875,045

(22) Filed: Jun. 7, 2001

(65) Prior Publication Data

US 2001/0053133 A1 Dec. 20, 2001

(30) Foreign Application Priority Data

Jun. 9, 2000 (JP) .............................. 2000-174491

(51) Int. Cl.⁷ .............................................. H04Q 7/00
(52) U.S. Cl. ..................................... 370/329; 370/389
(58) Field of Search ............................ 370/462, 395.2, 370/431, 329, 389, 328, 509; 455/450

(56) References Cited

U.S. PATENT DOCUMENTS

| 5,774,660 | A | * | 6/1998 | Brendel et al. ............. 709/201 |
| 5,802,465 | A | | 9/1998 | Hamalainen et al. |
| 6,016,318 | A | | 1/2000 | Tomoike |
| 6,167,248 | A | | 12/2000 | Hamalainen et al. |
| 6,704,786 | B1 | * | 3/2004 | Gupta et al. ................ 709/228 |
| 2002/0009073 | A1 | * | 1/2002 | Furukawa et al. .......... 370/352 |
| 2003/0133461 | A1 | * | 7/2003 | Ho et al. ............... 370/395.52 |

FOREIGN PATENT DOCUMENTS

| JP | 7-170579 | 7/1995 |
| JP | 10-23533 | 1/1998 |
| JP | 10-32610 | 2/1998 |
| JP | 10-112738 | 4/1998 |
| JP | 10-336751 | 12/1998 |

* cited by examiner

Primary Examiner—Chau Nguyen
Assistant Examiner—Zewdu Habte
(74) Attorney, Agent, or Firm—Foley & Lardner LLP

(57) ABSTRACT

A TCP/IP (Transmission Control Protocol/Internet Protocol) communication system includes a provider side unit to which a first communication terminal is operatively connected through a line network; and a mobile switching controller to which a second communication terminal is operatively connected. The mobile switching controller includes first and second termination circuits, a detecting unit, a line signal circuit and a switch. The first termination circuit is connected between the mobile switching controller and the provider side unit to transfer data on a first channel from the second communication terminal to the first communication terminal. The second termination circuit is connected between the mobile switching controller and the provider side unit to transfer data on a second channel from the first communication terminal to the second communication terminal. The detecting unit is connected to the first and second termination circuits, and detects an IP address and a first message from first data as the data transmitted from one of the first and second communication terminal, and a second message from second data as the data transmitted from the other. The first message is detected when the first data has a finish flag and an acknowledgement flag which are set, and the second message is detected from the second data responding to the first data and having an acknowledgement flag which is set. The line signal circuit converts the IP address into a terminal number. The switch releases the first and second channels associated with the terminal number.

11 Claims, 7 Drawing Sheets

TCP/IP COMMUNICATION SYSTEM AND COMMUNICATION CHANNEL RELEASING METHOD IN THE SAME

BACKGROUND OF THE INVENTION

1. Field of the Invention

The present invention relates to a TCP/IP (Transmission Control Protocol/Internet Protocol) communication system, and more particularly to a communication channel releasing method at the time of non-communication in a TCP/IP communication system.

2. Description of the Related Art

Conventionally, in the TCP/IP mobile communication networks such as the Internet, the Intra-net, the Extra-net and the UNIX workstation network, a communication channel is released at the time of a final completion in a data communication caused by a key operation in a mobile communication terminal or at the time of an on-hook key operation associated with communication end.

FIG. 1 is a block diagram showing a structure of the conventional TCP/IP mobile communication network. In this TCP/IP mobile communication network, a mobile switching controller (MSC) 4 accommodates an Internet line network 1, an Internet service provider apparatus (ISP) 2 and an access server (an asynchronous serial—LAN protocol converter) 3. The Internet line network 1 includes a digital telephone line network, an analog telephone line network and a digital mobile telephone network.

Also, the mobile switching controller 4 accommodates a radio base station controller (BSC) 6 and a radio base station (BTS) 7. The radio base station 7 accommodates a mobile station (MS) 8 through a radio channel (air interface). A data terminal (DTE) 10 is connected through a data communication adapter (MS-ADP) 9 to the mobile station 8. The data terminal 10 is composed of a mobile personal computer containing a browser (application program) and the like. It should be noted that the mobile station 8 may be a portable telephone having a browser such as a portable telephone operating in an I-mode. The I-mode is information service provided by a NTT DoCoMo, Inc.

The mobile switching controller 4 includes an inter working function apparatus (HPM-IWF) 4a and a time division switch (TDNW) 4b in order to carry out a connection process to the Internet service provider apparatus 2. A call processor (CP) 4c is connected to the time division switch 4b to carry out call processing. A signal relay unit (TRK) 14 accommodates a plurality of trunk lines and is connected to the call processor (CP) 4c.

FIG. 2 is a block diagram showing the structure of the inter working function apparatus 4a. The inter working function apparatus 4a is composed of a radio line side termination reception circuit (ARQ-RX) 11a and a radio line side termination transmission circuit (ARQ-TX) 12b for terminating a transmission error control protocol on a radio line side, and a communication line side termination transmission circuit (ASYNC-TX) 11b and a communication line side termination reception circuit (ASYNC-RX) 12a for terminating communication in a serial communication line, and a line signal circuit 13.

In the TCP/IP mobile communication network shown in FIG. 1, communication is carried out between terminals, i.e., between a communication terminal (not shown) on the side of the Internet line network 1 and the data terminal 10. The mobile switching controller 4 and the call processor 4c carry out a switching process for a process for a user data transfer channel and a control channel. In the communication between the terminals in the TCP/IP mobile communication network, the communication line is released only at the time of a final completion caused by a key operation at the communication terminal or the data terminal 10 or at the time of an on-hook key operation associated with communication end.

The plurality of signal relay units 14 are installed inside the mobile switching controller 4 to accommodate a plurality of physical lines. In some case, the plurality of signal relay units 14 may be installed outside the mobile switching controller 4. The line signal circuit 13 selects one from among the plurality of signal relay units 14. This operation corresponds to a selection of physical lines. It should be noted that, in such a TCP/IP mobile communication network, there may be a case that such a signal relay unit is also installed between the mobile switching controller 4 and the radio base station controller 6. However, the illustration for such a structure is omitted.

In this conventional TCP/IP mobile communication network, the communication line is released at the time of an on-hook key operation in the terminal. Also, it is necessary to install the plurality of signal relay units composed of the trunk circuits and physical lines in the mobile switching controller. The signal relay unit is required to be set at a usable state even at the time of a non-communication. Also, the radio line in the radio region is at a connection state. Therefore, a definite radio frequency band cannot be effectively used and also a statistically multiplexing effect due to a packet multiplexing cannot be achieved.

Also, in the conventional TCP/IP mobile communication network, the mobile switching controller selects one of the plurality of signal relay unites every call. That is, this operation corresponds to the selection of one of the physical lines. This results in the increases in the size of the apparatuses and the size of the processes.

In conjunction with the above description, "Mobile Communication Base Station, Portable Telephone Terminal And Mobile Communication System" is disclosed in Japanese Laid Open Patent Application (JP-A-Heisei, 10-23533). In this mobile communication system, a portable telephone terminal is composed of a terminal controller for fixing/releasing a reception channel in accordance with a reception of a channel fixing/releasing control signal from a mobile communication base station and setting a non-transfer channel fixed waiting mode or a waiting mode in accordance with reception of a transmitter on/off signal. A frequency synthesizer fixes an oscillation frequency in accordance with reception of a fixed signal of a reception channel from the terminal controller. The mobile communication base station has a base station controller for establishing a call path through a common control channel. The base station controller also controls a transmission of the channel fixing/releasing control signal to fix or release the reception channel for the portable telephone terminal. Then, the base station controller controls transmission of transmitter on and off signals to turn on and off the transmission from the portable telephone terminal. Thus, a mobile communication system stops the transmission from the portable telephone terminal or turning off a power supply at a particular location without any dependence on a manual operation.

Also, Japanese Laid Open Patent Application (JP-A-Heisei, 10-112738) discloses "Data Terminal That Can Carry Out Radio Data Communication". This data terminal contains therein a radio modem function block in which IP packet data can be automatically sent and received based on the TCP/IP protocol by using a control channel. In the radio modem function block, a signal controller controls data transmission/reception between portable telephones. A data terminal communication controller processes data from data communication software, and recognizes and outputs a modem control command. A modem control command processor receives the modem control command, and starts a packet communication interface. The packet communication interface outputs, by using the control channel, trigger signals for start and end of an IP packet data communication to the signal controller. Also, the data communication protocol processor carries out a data link procedure for the IP packet data communication. Thus, the IP packet data communication can be carried out by using the control channel between the portable telephone and a radio base station.

SUMMARY OF THE INVENTION

Therefore, an object of the present invention is to provide a communication channel releasing method at the time of a non-communication in a TCP/IP communication system.

Another object of the present invention is to provide a TCP/IP communication system in which a radio frequency band can be effectively used.

Still another object of the present invention is to provide a TCP/IP communication system in which a channel can be released at the time of the non-communication resulting from the finish of a data transfer.

Yet still another object of the present invention is to provide a TCP/IP communication system in which a statistical multiplexing effect can be improved.

It is an object of the present invention is to provide a TCP/IP communication system in which a number of signal relay unites is not required in a mobile switching controller.

Another object of the present invention is to provide a TCP/IP communication system in which a size of a signal process and a size of an apparatus can be reduced.

In the TCP/IP communication system according to the second embodiment of the present invention, the first and second information detectors, the converter and the controller can be installed in an inter working function apparatus jointly placed in the mobile switching controller.

In an aspect of the present invention, a TCP/IP (Transmission Control Protocol/Internet Protocol) communication system includes a provider side unit to which a first communication terminal is operatively connected through a line network; and a mobile switching controller to which a second communication terminal is operatively connected. The mobile switching controller includes first and second termination circuits, a detecting unit, a line signal circuit and a switch. The first termination circuit is connected between the mobile switching controller and the provider side unit to transfer data on a first channel from the second communication terminal to the first communication terminal. The second termination circuit is connected between the mobile switching controller and the provider side unit to transfer data on a second channel from the first communication terminal to the second communication terminal. The detecting unit is connected to the first and second termination circuits, and detects an IP address and a first message from first data as the data transmitted from one of the first and second communication terminal, and a second message from second data as the data transmitted from the other. The first message is detected when the first data has a finish flag and an acknowledgement flag which are set, and the second message is detected from the second data responding to the first data and having an acknowledgement flag which is set. The line signal circuit converts the IP address into a terminal number. The switch releases the first and second channels associated with the terminal number.

The detecting unit may include a first detector which is connected to the first termination circuit, and detects the IP address and the first message from the data transmitted from the first communication terminal to the second communication terminal, and a second detector which is connected to the second termination circuit, and detects the second message from the data transmitted from the second communication terminal to the first communication terminal.

Instead, the detecting unit may include a third detector which is connected to the second termination circuit, and detects the IP address and the first message from the data transmitted from the second communication terminal to the first communication terminal, and a fourth detector which is connected to the first termination circuit, and detects the second message from the data transmitted from the first communication terminal to the second communication terminal.

Otherwise, the detecting unit may include a first detector which is connected to the first termination circuit, and detects the IP address and the first message from the data transmitted from the first communication terminal to the second communication terminal, a second detector which is connected to the second termination circuit, and detects the second message from the data transmitted from the second communication terminal to the first communication terminal, a third detector which is connected to the second termination circuit, and detects the IP address and the first message from the data transmitted from the second communication terminal to the first communication terminal, and a fourth detector which is connected to the first termination circuit, and detects the second message from the data transmitted from the first communication terminal to the second communication terminal.

Also, the switch carries out a time divisional multiplexing operation to the data to be transferred.

Also, the TCP/IP communication system may further include a call processor controls the switch to release the first and second channels based on the terminal number.

In another aspect of the present invention, a communication channel releasing method is attained by (a) transferring data on a first channel from a first communication terminal to a second communication terminal; by (b) transferring data on a second channel from the second communication terminal to the first communication terminal; by (c) detecting an IP address and a first message from first data as the data transferred in one of the steps (a) and (b) and second communication terminal; and by (d) detecting a second message from second data as the data transferred in the other step, wherein the first message is detected when the first data has a finish flag and an acknowledgement flag which are set, and the second message is detected from the second data responding to the first data and having an acknowledgement flag which is set; by (e) converting the IP address into a terminal number; and by (f) releasing the first and second channels associated with the terminal number.

In this case, the (d) detecting step may be attained by detecting the IP address and the first message from the data transmitted from the first communication terminal to the second communication terminal; and by detecting the second message from the data transmitted from the second communication terminal to the first communication terminal.

Instead, the (c) detecting step may be attained by detecting the IP address and the first message from the data transmitted from the second communication terminal to the first communication terminal; and by detecting the second message from the data transmitted from the first communication terminal to the second communication terminal.

Otherwise, the (c) detecting step may be attained by detecting the IP address and the first message from the data transmitted from the first communication terminal to the second communication terminal; by detecting the second message from the data transmitted from the second communication terminal to the first communication terminal; by detecting the IP address and the first message from the data transmitted from the second communication terminal to the first communication terminal; and by detecting the second message from the data transmitted from the first communication terminal to the second communication terminal.

Also, the (a) and (b) transferring steps may be accomplished by carrying out by a time divisional multiplexing operation to the data to be transferred.

DESCRIPTION OF THE PREFERRED EMBODIMENTS

Hereinafter, a TCP/IP communication system of the present invention will be described below in detail with reference to the attached drawings.

Figure 1:
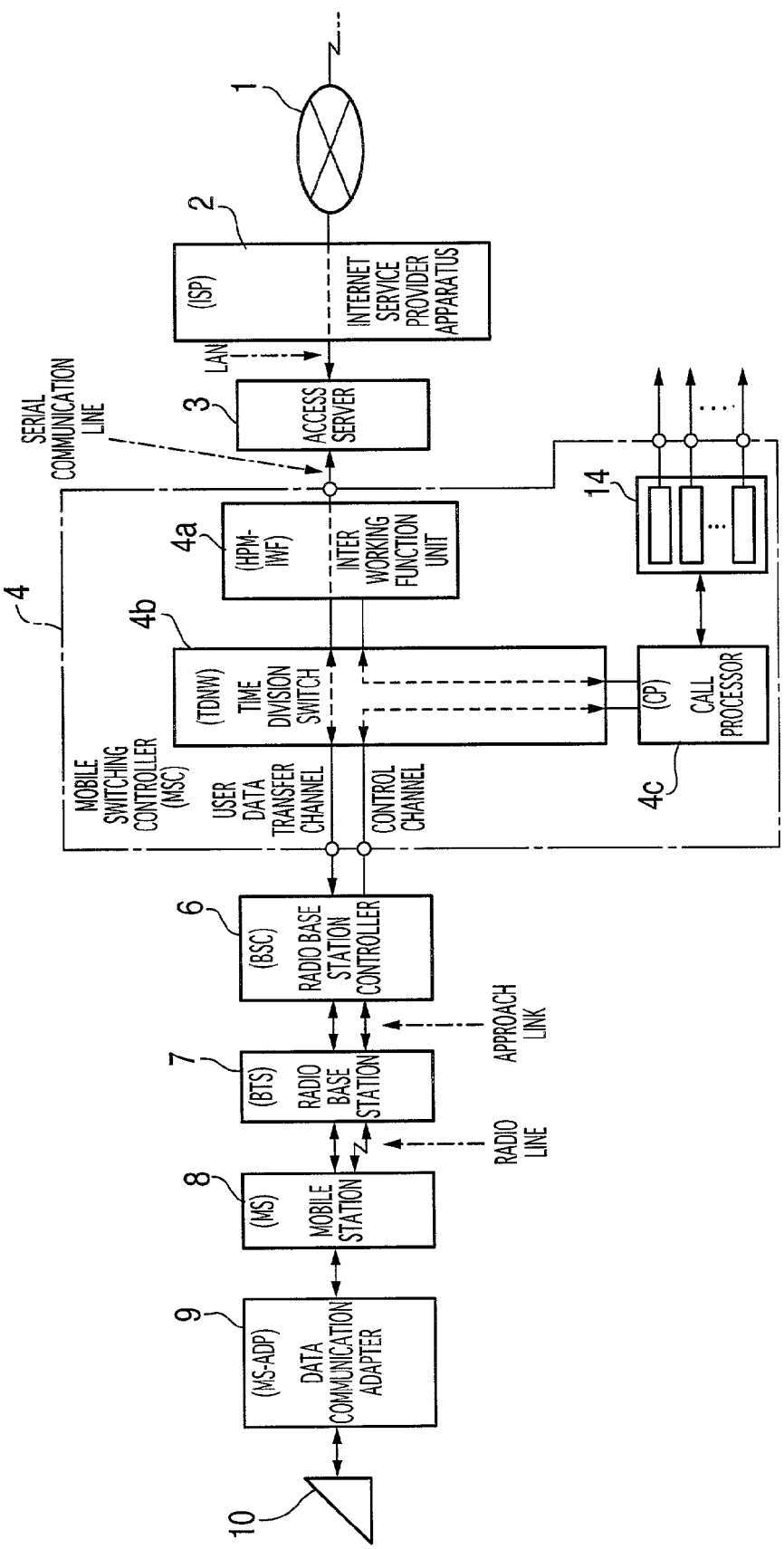
FIG. 1 is a block diagram showing the structure of a conventional TCP/IP mobile communication network.
Figure 2:
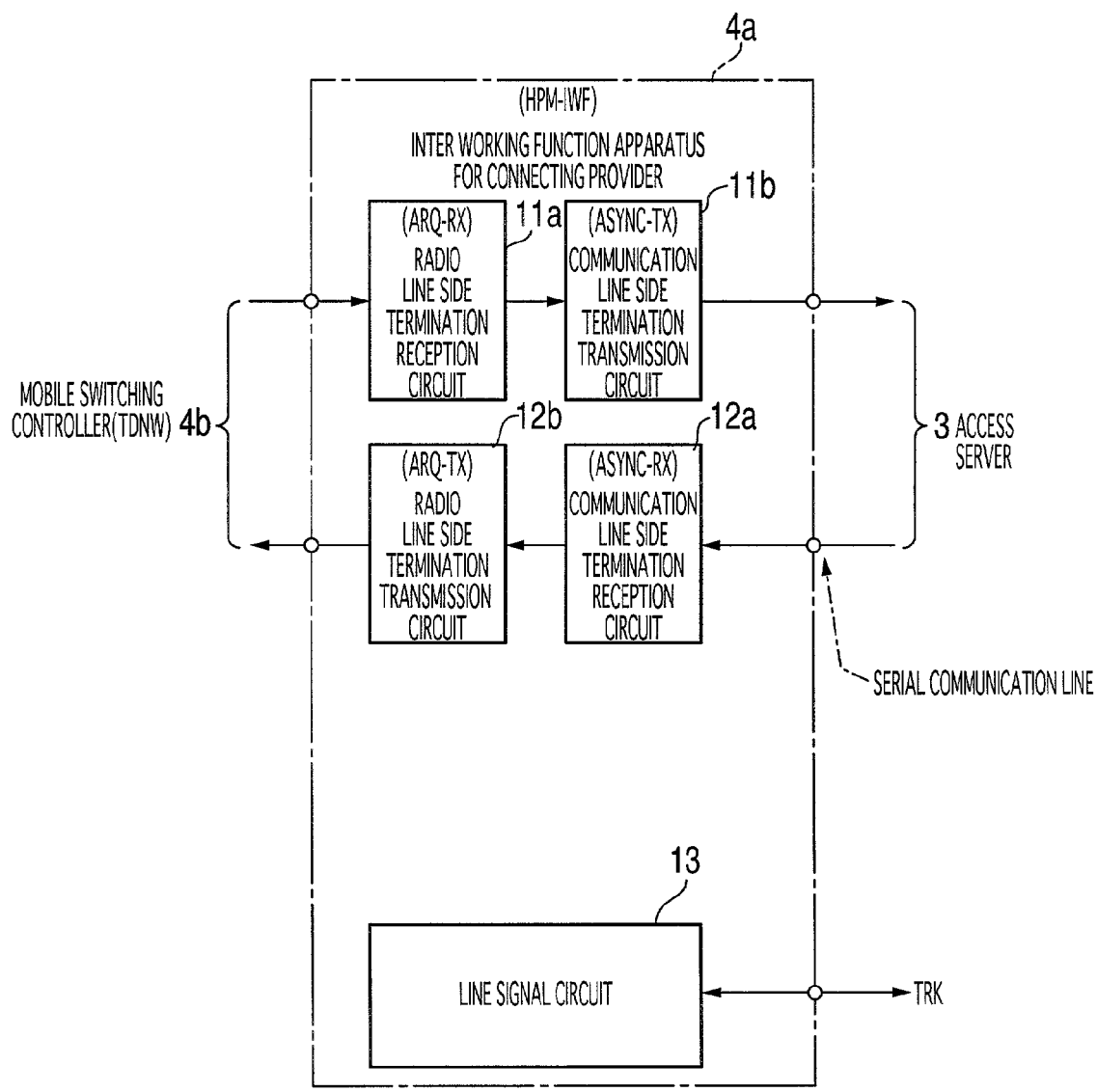
FIG. 2 is a block diagram showing the structure of an inter working function apparatus in FIG. 1.
Figure 3:
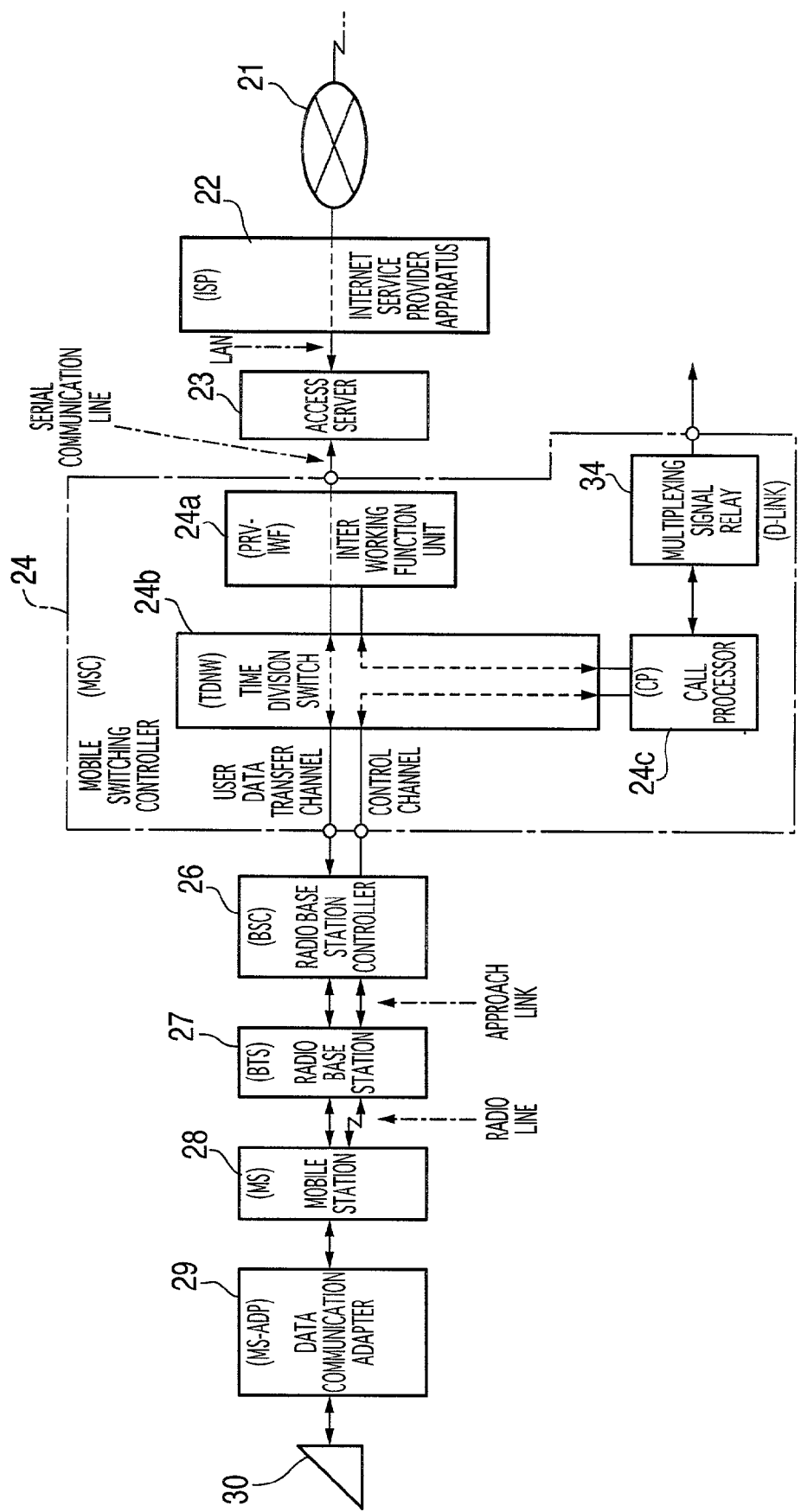
FIG. 3 is a block diagram showing the structure of a TCP/IP communication system according to a first embodiment of the present invention.

FIG. 3 is a block diagram showing the structure of the TCP/IP communication system according to the first embodiment of the present invention. The TCP/IP communication system carries out a communication channel releasing method.

Referring to FIG. 3, the TCP/IP communication system is composed of a TCP/IP mobile communication network. In the TCP/IP mobile communication network, an Internet line network 21 is connected through an Internet service provider apparatus (ISP) 22 to an access server (asynchronous serial—LAN protocol converter) 23. The Internet line network 21 is composed of various networks for the Internet connection such as a digital telephone line network (ISDN: Integrated Services Digital Network), an analog telephone line network (PSTN: Public Switched Telephone Network), a digital mobile telephone network (PDC: Personal Digital Cellular Telecommunication System, PHS: Personal Handyphone System).

The access server 23 is connected to one end of a mobile switching controller (MSC) 24. The other end of the mobile switching controller 24 is connected through a radio base station controller (BSC) 26 to a radio base station (BTS) 27. The radio base station 27 accommodates a mobile station (MS) 28 by using a radio interval (an air interface, a radio line connection). A data terminal (DTE) 30 is connected through a data communication adapter (MS-ADP) 29 to this mobile station 28. The data terminal 30 is composed of a mobile personal computer containing applications such as a browser.

It should be noted that the data terminal 30 is connected through the data communication adapter 29 to the mobile station 28 in this example. However, the mobile station 28 may be composed of a portable telephone which has the browser and can operate in the I-mode.

The mobile switching controller 24 contains therein an inter working function apparatus (PRV-IWF) 24a and a time division switch 24b for carrying out a time division multiplexing operation to data to be transferred, for a connection process to the Internet service provider apparatus 22. One end of the inter working function apparatus 24a is connected to the access server 23. The other end of the inter working function apparatus 24a is connected to one end of the time division switch (TDNW) 24b. The radio base station controller 26 is connected to the other end of the time division switch 24b.

A call processor (CP) 24c is connected to the time division switch 4b to control call processes such as a process for a user data transfer channel and a control channel. A single multiplexing signal relay unit (D-LINK) 34 is connected to the call processor 24 of the mobile switching controller 24 instead of many signal relay unites (TRKs) 14 conventionally used.

Figure 4:
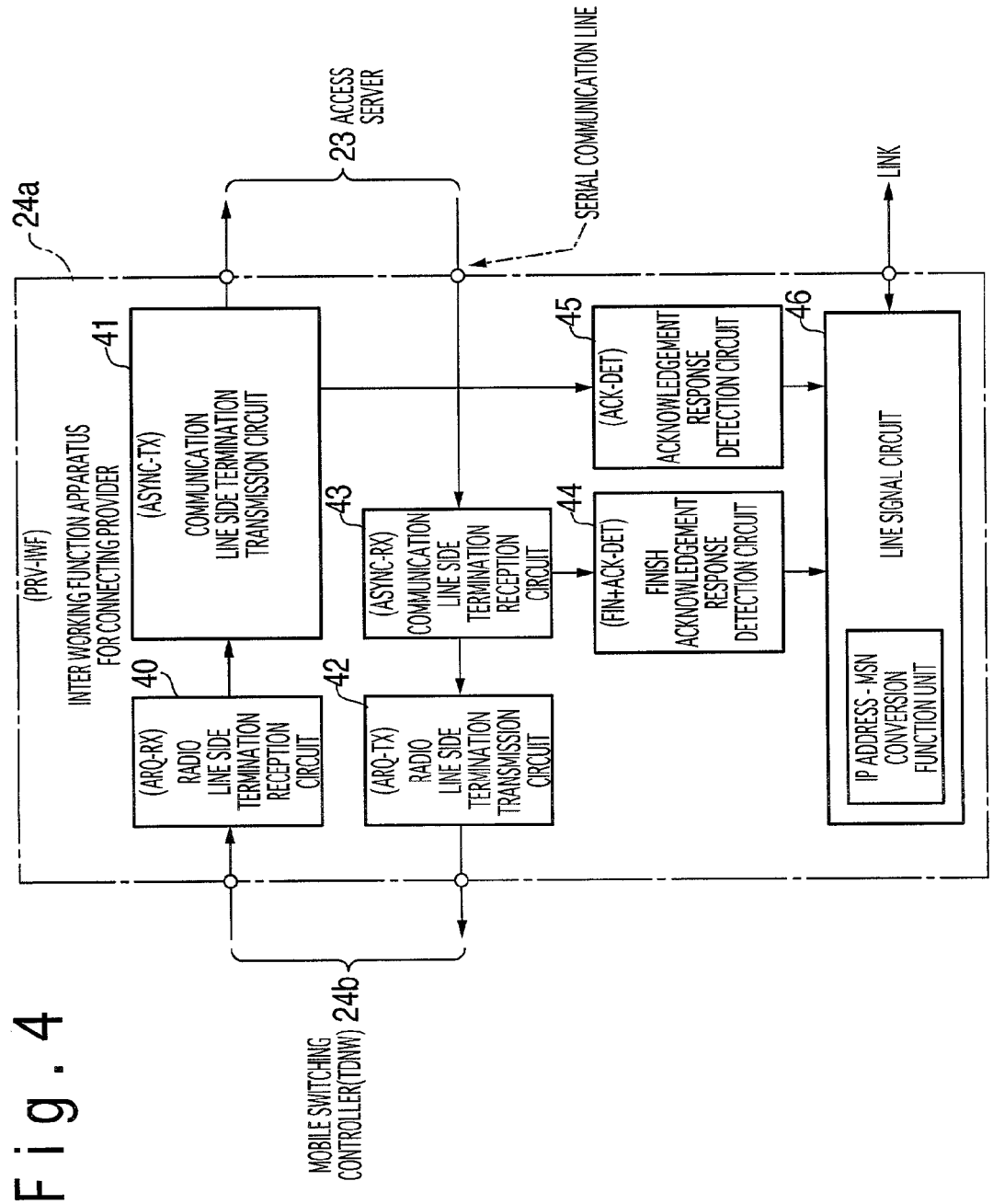
FIG. 4 is a block diagram showing the structure of an inter working function apparatus in the TCP/IP communication system according to the first embodiment of the present invention.

FIG. 4 is a block diagram showing the structure of the inter working function apparatus 24a. The inter working function apparatus 24a has a radio line side termination reception circuit (ARQ-RX) 40 and a radio line side termination transmission circuit (ARQ-TX) 42 for terminating a transmission error control protocol on a radio line side. Also, the inter working function apparatus 24a has a communication line side termination transmission circuit (ASYNC-TX) 41 and a communication line side termination reception circuit (ASYNC-RX) 43 for terminating a communication in a serial communication line from the access server 23.

A finish acknowledgement response detection circuit (FIN+ACK-DET) 44 is connected to the communication line side termination reception circuit 43. An acknowledgement response detection circuit (ACK-DET) 45 is connected to the communication line side termination transmission circuit 41. It should be noted that the word "FIN" is a finish description character string, and describes the finish of a data transfer, or the release of a TCP connection. The word "ACK" is an acknowledgment response character string, and the word "DET" implies detection.

A line signal circuit 46 is connected on the output sides of the finish acknowledgement response detection circuit 44 and acknowledgement response detection circuit 45. The line signal circuit 46 is connected to the multiplexing signal relay unit 34. The finish acknowledgement response detection circuit 44 monitors user data sent from the access server 23 to the radio line side termination transmission circuit 42 through the communication line side termination reception circuit 43. The finish acknowledgement response detection circuit 44 detects an IP address in a TCP/IP packet, and FIN and ACK in a TCP protocol message, and then outputs them to the line signal circuit 46.

The line signal circuit 46 uses an IP address mobile station number (MSN) conversion function unit therein to control the multiplexing signal relay unit 34. The multiplexing signal relay unit 34 is placed between the mobile switching controller 24 and the inter working function apparatus 24a, instead of the conventionally used signal relay unit (TRK). The multiplexing signal relay unit 34 allocates a plurality of communication channels as logical lines to a single physical line by carrying out a time division multiplexing operation based on a link control of the IP address mobile station number function unit.

The IP address mobile station number conversion function unit of the line signal circuit 46 determines whether or not the data transfer using the TCP/IP is finished, based on FIN and ACK from the finish acknowledgement response detection circuit 44 and ACK from the acknowledgement response detection circuit 45. If the data transfer is determined to be finished, the conversion function unit converts a corresponding IP address into the mobile station number (MSN), and sends the converted mobile station number (MSN) and a release request signal (RLS) to the time division switch 24b and the multiplexing signal relay unit 34. The release request signal (RLS) is a signal for commanding the release of the communication channel to the inter working function apparatus 24a.

The operation of the TCP/IP mobile communication network having the above-mentioned structure will be described below.

At first, the entire operation is described with reference to FIG. 3. In this TCP/IP mobile communication network system, the communication channels between the data terminal 30 and a terminal (not shown) on the side of the Internet line network 21 are established through the access server 23 by the mobile switching controller 24. In the mobile switching controller 24, the communication channels are established when the call processor 24c controls the time division switch (TDNW) 24b. Thus, the terminal (not shown) on the side of the Internet line network 21 and the data terminal 30 on a radio side are connected through a line, and the communication is then carried out. In this case, the call processor 24c controls the multiplexing signal relay unit 34 so that a plurality of communication channels are multiplexed in time division. As a result, a plurality of logical lines are allocated to one physical line.

Figure 5:
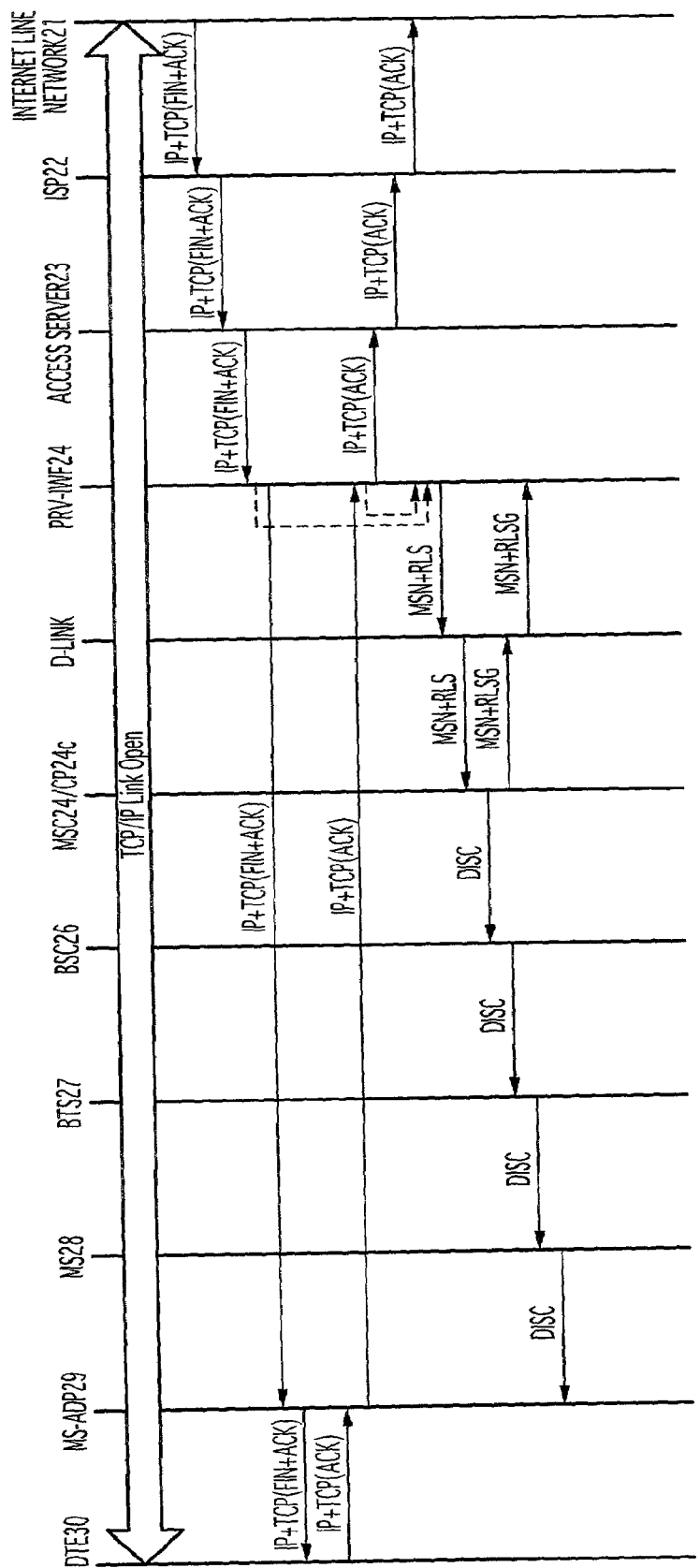
FIG. 5 is a sequence diagram showing an operation of the TCP/IP communication system according to the second embodiment of the present invention when a communication channel is released at the time of non-communication in a TCP/IP communication system.

The operation of the inter working function apparatus 24a will be described below with reference to FIG. 5.

The finish acknowledgement response detection circuit 44 detects an IP address in a TCP/IP packet sent through a serial communication line from a TCP/IP mobile communication terminal (not shown) on the side of the access server 23, and a message in which a FIN flag is true and an ACK flag is true in the TCP protocol message (hereafter, to be referred to as a FIN+ACK message). The FIN+ACK message is a message that is sent and received between the data terminal 30 and the TCP/IP mobile communication terminal (not shown) on the side of the Internet line network 21 when the data transfer using the TCP connection is finished and the TCP connection is released.

Here, the TCP connection is released at the time of not the finish of the data communication by the conventional on-hook but the finish of each data transfer during communication. Thus, the communication channel is frequently released, as compared a case where the communication channel is released based on the finish of the data communication by the on-hook. This results in the improvement in the statistically multiplexing effect.

The acknowledgement response detection circuit 45 detects the ACK flag in a confirmation response signal to the FIN+ACK message. That is, the acknowledgement response detection circuit 45 detects the ACK flag which is sent and received between the terminals when the TCP connection is released after the finish of the data transfer using the TCP connection. In this case, the acknowledgement response detection circuit 45 detects an IP address in a TCP/IP packet sent through the radio line, an approach link and the mobile switching controller 24 from the data terminal 30, and a message in which the ACK flag in the TCP protocol message is true (hereafter, referred to as an ACK message).

When the logical AND of the FIN+ACK message and the ACK message is true, namely, at the time of the finish of each data transfer, the line signal circuit 46 converts the corresponding IP address into the mobile station number (MSN). Then, the line signal circuit 46 sends the converted mobile station number and the release request signal (RLS) to the time division switch 24b and the multiplexing signal relay unit 34. The release request signal is used to command the release of the communication channel to the inter working function apparatus 24a. Also, the line signal circuit 46 receives a release protection signal (RLSG) as a confirmation response signal to the mobile station number and of the release request signal from the mobile switching controller 24 and releases the communication channel. After that, in the sequence of FIG. 5, a line disconnection signal (DISC) is sequentially transferred from the mobile switching controller 24 to the data communication adapter 29.

Figure 6:
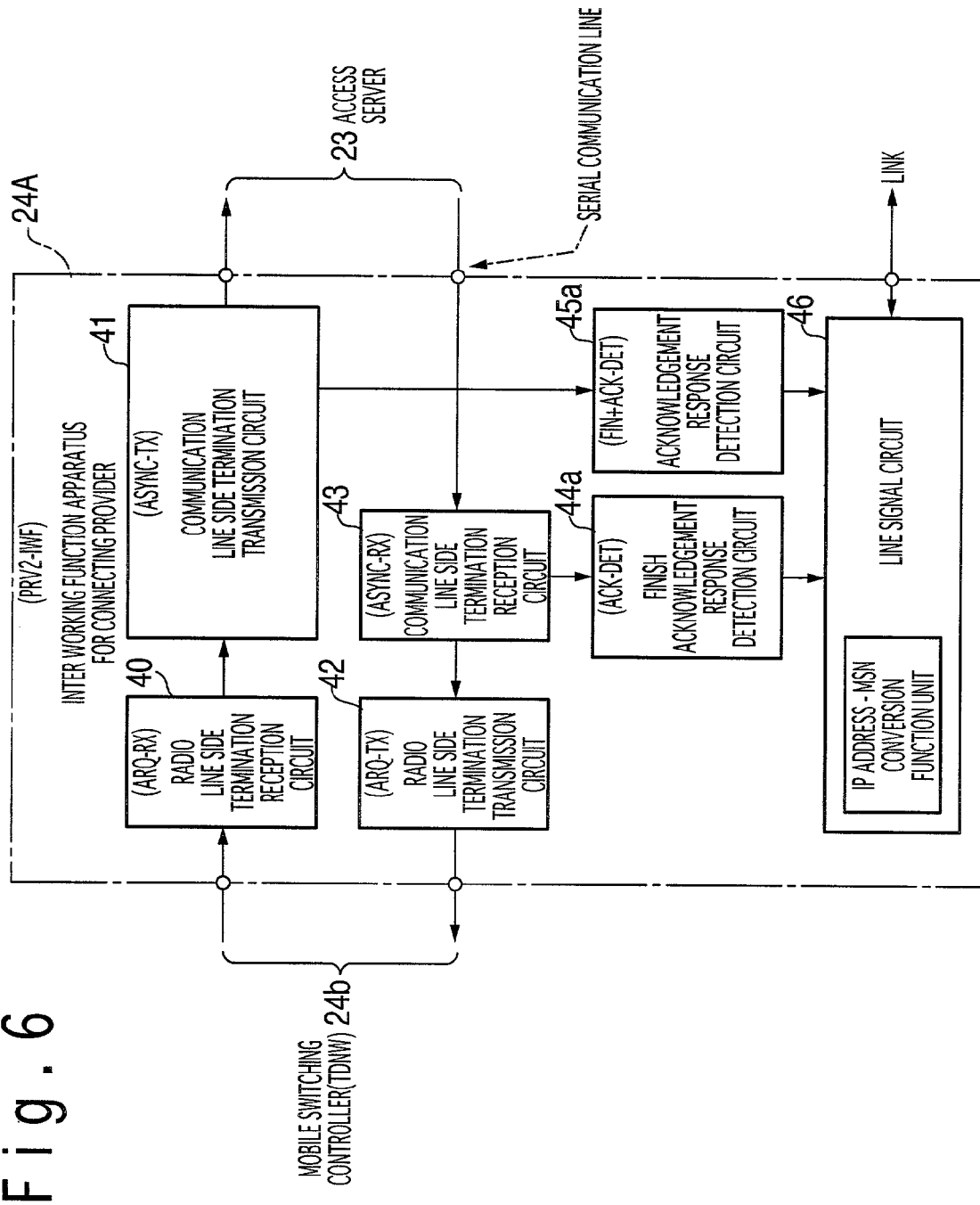
FIG. 6 is a block diagram showing the structure of an inter working function apparatus in the TCP/IP communication system according to a second embodiment of the present invention.

FIG. 6 is a block diagram showing a structure of an inter working function apparatus (PRV2-IWF) in the TCP/IP communication system according to the second embodiment of the present invention. In FIG. 6, the inter working function apparatus (PRV2-IWF) 24A differs from the inter working function apparatus (PRV2-IWF) 24a shown in FIG. 4 in that a direction of a TCP/IP packet to be monitored is different. The inter working function apparatus 24A is composed of the radio line side termination reception circuit 40, the radio line side termination transmission circuit 42, the communication line side termination transmission circuit 41, the communication line side termination reception circuit 43 and the line signal circuit 46, which are similar to those of FIG. 4.

An acknowledgement response detection circuit 44a is connected to the communication line side termination reception circuit 43, and a finish acknowledgement response detection circuit 45a is connected to the communication line side termination transmission circuit 41. Also, the line signal circuit 46 is connected to the output sides of the acknowledgement response detection circuit 44a and finish acknowledgement response detection circuit 45.

Figure 7:
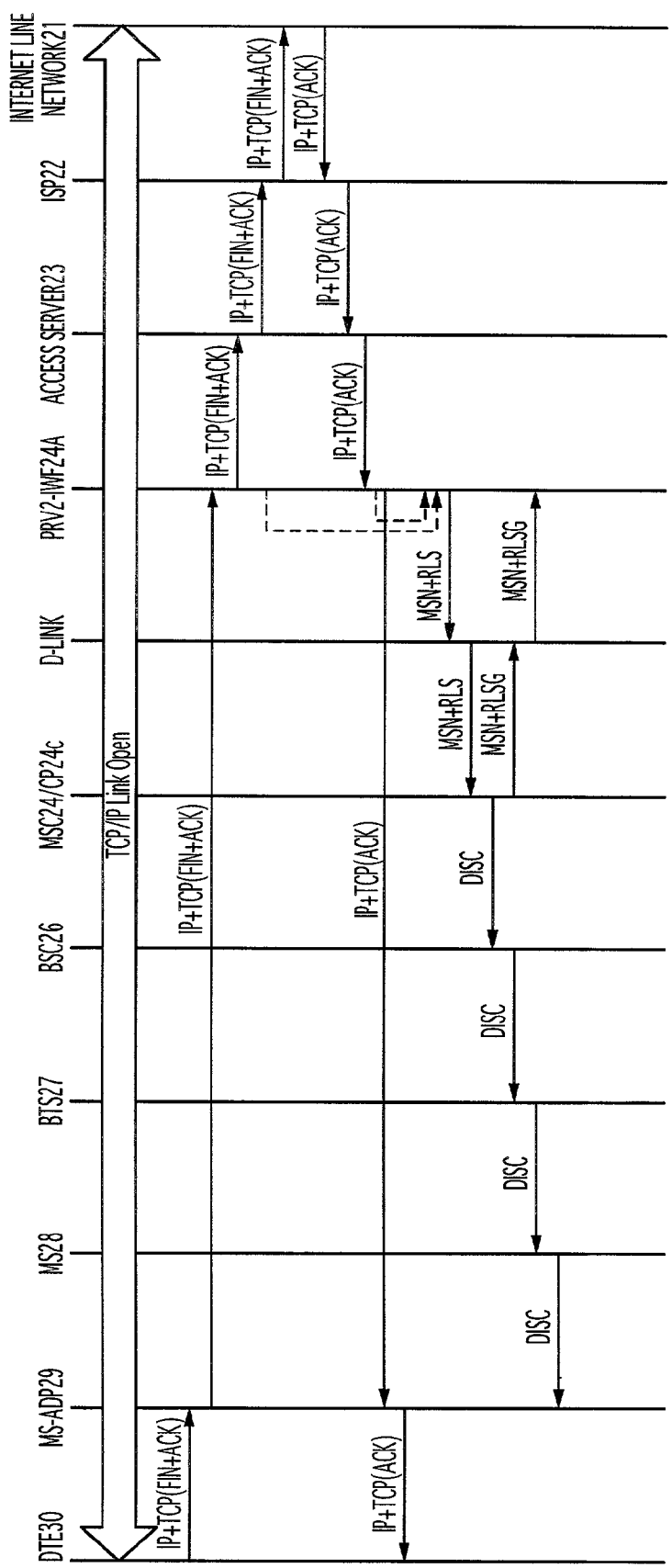
FIG. 7 is a sequence diagram showing an operation of the TCP/IP communication system according to the second embodiment of the present invention.

The operation of the TCP/IP network system according to the second embodiment of the present invention having the above-mentioned structure will be described below with reference to FIG. 7.

The finish acknowledgement response detection circuit 45a detects the IP address in the TCP/IP packet which is sent and received between the data terminal 30 and the TCP/IP mobile communication terminal (not shown) on the side of the Internet line network 21 when the TCP connection is released after the finish of the data transfer using the TCP connection. In the FIN+ACK message, a FIN flag is true and an ACK flag is true in the TCP protocol message. That is, the finish acknowledgement response detection circuit 45a detects the IP address in the TCP/IP packet sent through the radio line, the approach link and the mobile switching controller 24 from the data terminal 30. In the FIN+ACK message, the FIN flag is true and the ACK flag is true in the TCP protocol message.

The acknowledgement response detection circuit 44a detects the IP address, which is the confirmation response signal to the FIN+ACK message, and the ACK flag in the TCP protocol message. That is, the acknowledgement response detection circuit 44a detects the IP address in the TCP/IP packet sent through the serial communication line from the mobile communication terminal (not shown) accommodated in the Internet line network 21 on the side of the access server 23, when the TCP connection is released after the finish of the data transfer using the TCP connection. In the ACK message, the ACK flag is true in the TCP protocol message.

When the logical AND of the FIN+ACK message and the ACK message is true, i.e., at the time of the data transfer finish, the line signal circuit 46 converts the corresponding IP address into the mobile station number. Then, the line signal circuit 46 sends the converted mobile station number and the release request signal to the time division switch 24b and the multiplexing signal relay unit 34. The release signal is used to command the release of the communication channel to the inter working function apparatus 24A. Also, the line signal circuit 46 receives the release protection signal as the confirmation response signal to the mobile station number and the open request signal from the side of the mobile switching controller 24, and releases the communication channel. After that, in the sequence of FIG. 7, the line disconnection signal (DISC) is sequentially transferred from the mobile switching controller 24 to the data communication adapter 29.

It should be noted that in this embodiment, the mobile communication network has been described in which the one side of the mobile switching controller (MSC) 24 is composed of units from the radio base station controller 26 to the data terminal 30. However, this is similarly operated even in the fixed communication network.

It should be noted that the above first and second embodiments may be combined.

As apparent from the above-mentioned description, according to the present invention, the larger number of mobile terminals can be accommodated by releasing the communication channels at the time of the non-communication, and also possible to effectively use the radio frequency band in the TCP/IP mobile communication.

Also, according to the present invention, the time division multiplexing operation derives the attainment of the statistically multiplexing effect in the TCP/IP mobile communication.

Moreover, according to the present invention, the time division multiplexing operation can reduce the number of signal relay unites installed to accommodate a number of physical lines in the mobile switching controller.

What is claimed is:

1. A TCP/IP (Transmission Control Protocol/Internet Protocol) communication system comprising:
   a provider side unit to which a first communication terminal is operatively connected through a line network; and
   a mobile switching controller to which a second communication terminal is operatively connected, and
   wherein said mobile switching controller comprises:
   a first termination circuit connected between said mobile switching controller and said provider side unit to transfer data on a first channel from said second communication terminal to said first communication terminal;
   a second termination circuit connected between said mobile switching controller and said provider side unit to transfer data on a second channel from said first communication terminal to said second communication terminal;
   a detecting unit which is connected to said first and second termination circuits, and detects an IP address and a first message from first data as said data transmitted from one of said first and second communication terminal, and a second message from second data as said data transmitted from the other, wherein said first message is detected when said first data has a finish flag and an acknowledgement flag which are set, and said second message is detected from said second data responding to said first data and having an acknowledgement flag which is set;
   a line signal circuit which converts said IP address into a terminal number; and
   a switch which releases said first and second channels associated with said terminal number.

2. The TCP/IP communication system according to claim 1, wherein said detecting unit comprises:
   a first detector which is connected to said first termination circuit, and detects said IP address and said first message from said data transmitted from said first communication terminal to said second communication terminal; and
   a second detector which is connected to said second termination circuit, and detects said second message from said data transmitted from the second communication terminal to said first communication terminal.

3. The TCP/IP communication system according to claim 1, wherein said detecting unit comprises:
   a third detector which is connected to said second termination circuit, and detects said IP address and said first message from said data transmitted from said second communication terminal to said first communication terminal; and
   a fourth detector which is connected to said first termination circuit, and detects said second message from said data transmitted from the first communication terminal to said second communication terminal.

4. The TCP/IP communication system according to claim 1, wherein said detecting unit comprises:
   a first detector which is connected to said first termination circuit, and detects said IP address and said first message from said data transmitted from said first communication terminal to said second communication terminal;
   a second detector which is connected to said second termination circuit, and detects said second message from said data transmitted from the second communication terminal to said first communication terminal;
   a third detector which is connected to said second termination circuit, and detects said IP address and said first message from said data transmitted from said second communication terminal to said first communication terminal; and
   a fourth detector which is connected to said first termination circuit, and detects said second message from said data transmitted from the first communication terminal to said second communication terminal.

5. The TCP/IP communication system according to claim 1, wherein said switch carries out a time divisional multiplexing operation to said data to be transferred.

6. The TCP/IP communication system according to claim 1, further comprising a call processor controls said switch to release said first and second channels based on said terminal number.

7. A communication channel releasing method comprising the steps of:
   (a) transferring data on a first channel from a first communication terminal to a second communication terminal;
   (b) transferring data on a second channel from said second communication terminal to said first communication terminal;
   (c) detecting, by a mobile switching controller that is separate from said first and second communication terminals and that is provided on a network connecting said first and second communication terminals, an IP address and a first message from first data as said data transferred in one of said steps (a) and (b) and second communication terminal; and
   (d) detecting, by said mobile switching controller, a second message from second data as said data transferred in the other of steps (a) and (b), wherein said first message is detected when said first data has a finish flag and an acknowledgement flag which are set, and said second message is detected from said second data responding to said first data and having an acknowledgement flag which is set;
   (e) converting, by said mobile switching controller, said IP address into a terminal number; and
   (f) releasing, by said mobile switching controller, said first and second channels associated with said terminal number.

8. The communication channel releasing method according to claim 7, wherein said (d) detecting step comprises the steps of:
   detecting said IP address and said first message from said data transmitted from said first communication terminal to said second communication terminal; and
   detecting said second message from said data transmitted from the second communication terminal to said first communication terminal.

9. The communication channel releasing method according to claim 7, wherein said (c) detecting step comprises the steps of:
   detecting said IP address and said first message from said data transmitted from said second communication terminal to said first communication terminal; and
   detecting said second message from said data transmitted from the first communication terminal to said second communication terminal.

10. The communication channel releasing method according to claim 7, wherein said (c) detecting step comprises the steps of:
    detecting said IP address and said first message from said data transmitted from said first communication terminal to said second communication terminal;
    detecting said second message from said data transmitted from the second communication terminal to said first communication terminal;
    detecting said IP address and said first message from said data transmitted from said second communication terminal to said first communication terminal; and
    detecting said second message from said data transmitted from the first communication terminal to said second communication terminal.

11. The communication channel releasing method according to claim 7, wherein said (a) and (b) transferring steps are accomplished by carrying out by a time divisional multiplexing operation to said data to be transferred.

* * * * *